Figure 6:
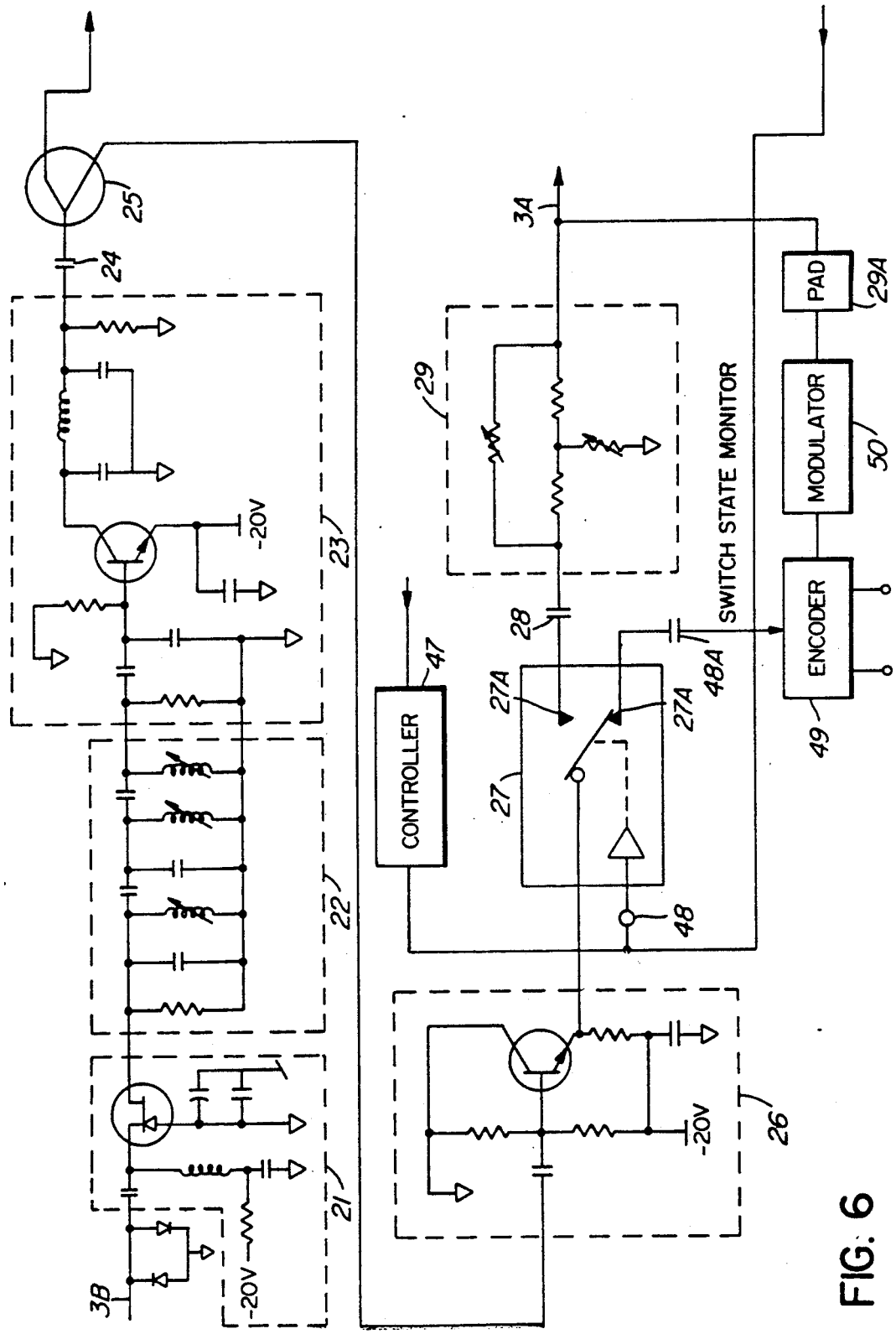

United States Patent [19]
Dufresne et al.

[11] Patent Number: 5,126,840
[45] Date of Patent: Jun. 30, 1992

[54] FILTER CIRCUIT RECEIVING UPSTREAM SIGNALS FOR USE IN A CATV NETWORK

[75] Inventors: Michel Dufresne, Boucherville; Samir Sammoun, Frossard; Alain Tessier, Piedmont; Fracois Methot, Montreal, all of Canada

[73] Assignee: Videotron LTEE, Quebec, Canada

[21] Appl. No.: 603,238

[22] Filed: Oct. 25, 1990

Related U.S. Application Data

[62] Division of Ser. No. 341,702, Apr. 21, 1989, Pat. No. 4,982,440.

[51] Int. Cl.$^5$ .............................................. H04H 1/00
[52] U.S. Cl. ......................... 358/86; 455/4.1; 455/5.1; 455/67.1
[58] Field of Search ................ 333/17.1, 14, 19; 455/3, 4, 5, 6, 339; 358/86

[56] References Cited

U.S. PATENT DOCUMENTS 3,750,022  7/1973  Curry et al. .......................... 455/6

Primary Examiner—Reinhard J. Eisenzopf
Assistant Examiner—Lisa Charouel
Attorney, Agent, or Firm—Antonelli, Terry, Stout & Kraus

[57] ABSTRACT

A two-way CATV network which in the preferred embodiment uses gating upstream narrowband filters in the distribution lines and/or trunks to substantially reduce upstream noise gathering. The filters sense the upstream signal energy and open in the event the energy exceeds a predetermined threshold.

18 Claims, 6 Drawing Sheets

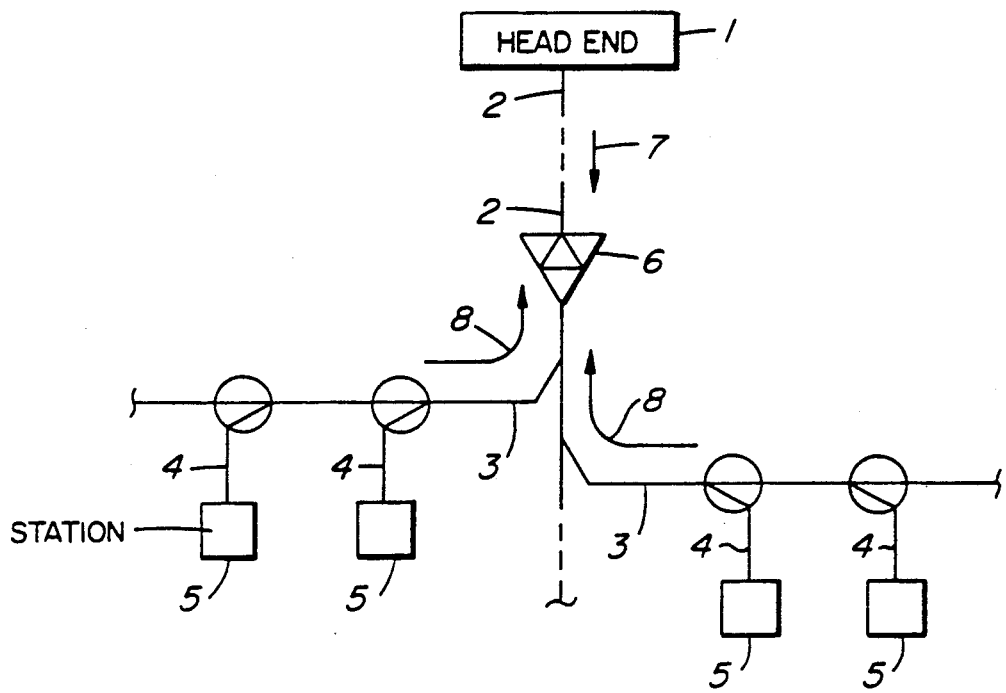
PRIOR ART
FIG. 1
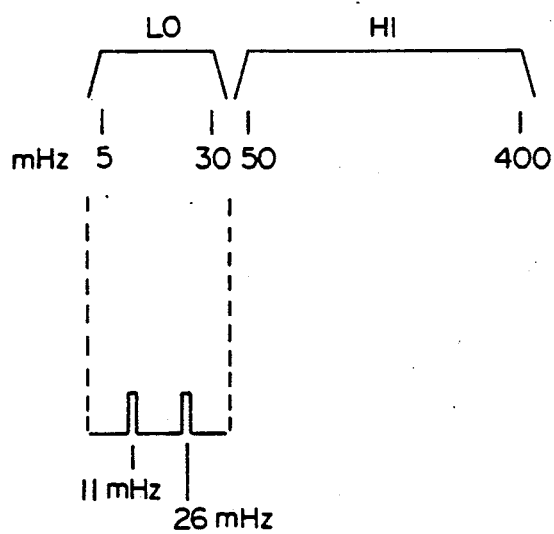
FIG. 2A
FIG. 2B

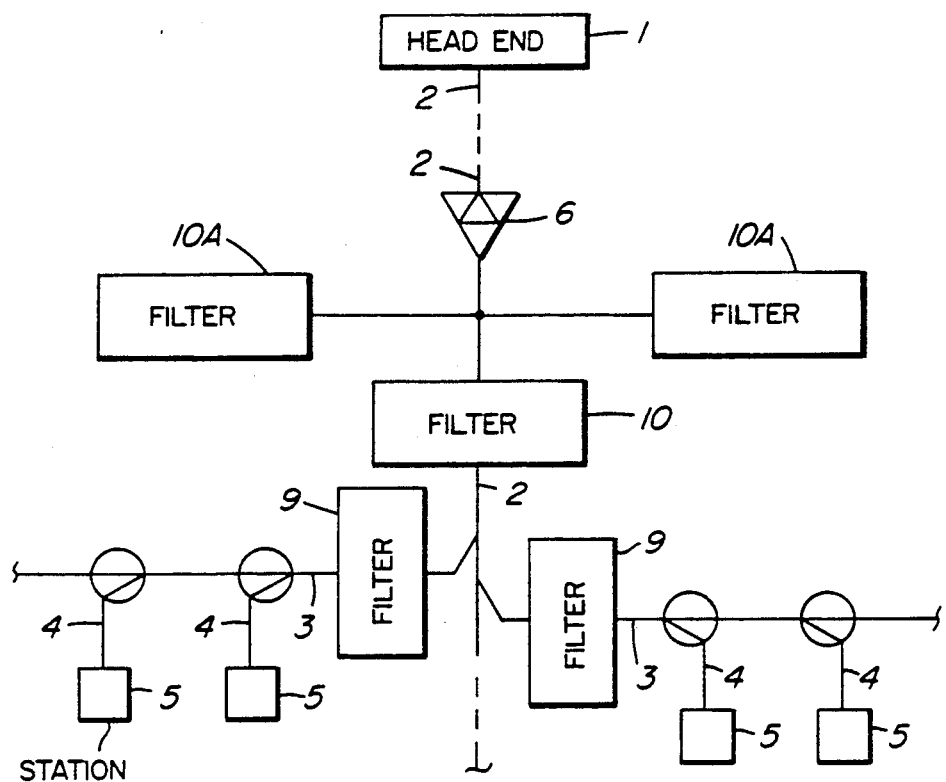
FIG. 3
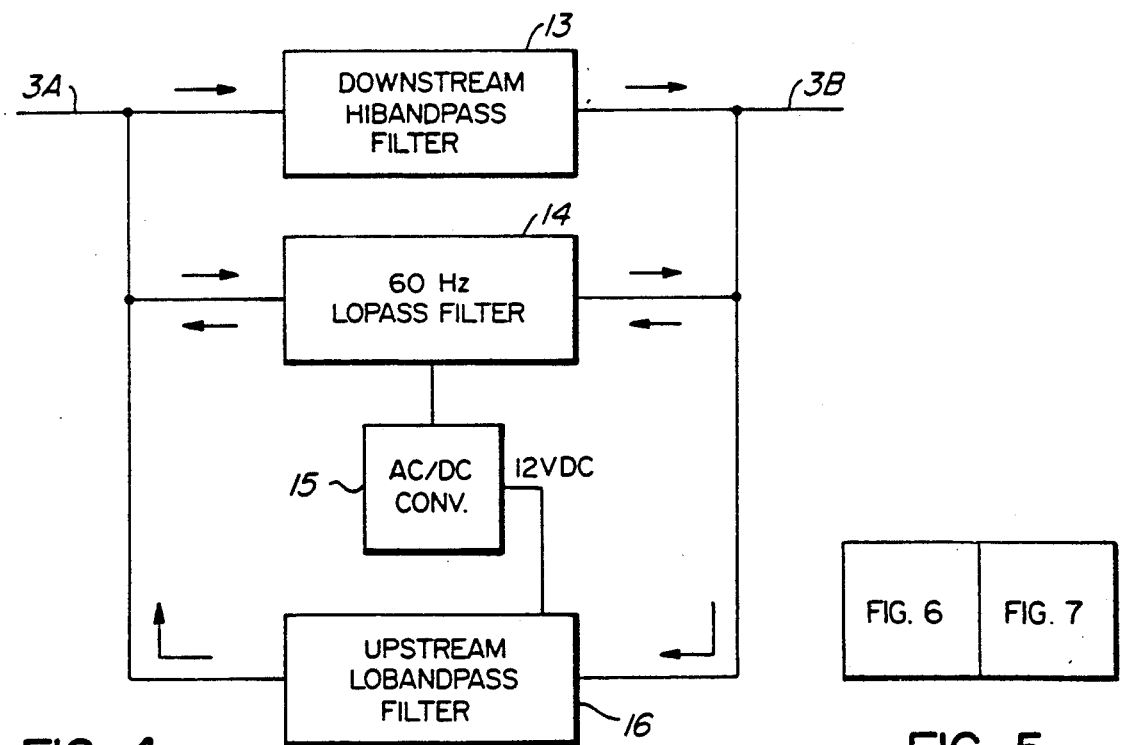
FIG. 4
FIG. 5

FILTER CIRCUIT RECEIVING UPSTREAM SIGNALS FOR USE IN A CATV NETWORK

This application is a divisional of application Ser. No. 341,702, filed Apr. 21, 1989, now U.S. Pat. No. 4,982,440.

This invention relates to cable television (CATV) networks and in particular to a reliable bidirectional CATV network.

CATV networks have in the past been structured with a head end which provides the various signals, connected to a trunk, distribution lines connected to the trunk, and sometimes subdistribution lines connected to the distribution lines (herein being grouped with distribution lines). Subscriber drops are connected to the distribution lines. CATV signals pass from the head end along the trunk, through the distribution lines and the subscriber drops to television sets or other subscriber terminals at various subscriber locations.

In order to facilitate enhanced subscriber services, some CATV systems have been made bidirectional, that is, they contain bidirectional amplifiers to enable signals to be transmitted both from the subscriber locations to the head end and from the head end to the subscriber locations. Such enhanced services were envisioned to facilitate e.g. pay per view of TV programs, ordering products displayed on television channels, playing of interactive video games, responding to polls, answering questions provided by a lecture course, etc.

It has been found that bidirectional systems have been unsuccessful because of a major noise gathering problem which was encountered. Noise caused by electronic or radio interference, poor terminal connections, ground currents, power lines and noise carried thereon, automobile ignitions, etc. arises on the subscriber drops and distribution lines and all feed into the trunk and head end in the upstream direction. The noise is random and interferes to a prohibitive extent with legitimate signals transmitted upstream via the system from the various subscribers.

In order to make an existing bidirectional system work, CATV operators have had to rebuild their distribution systems entirely to eliminate all possible sources of interference, or use code operated switches in bridgers addressed from the head end to isolate distribution lines from the trunk and open only one distribution line at a time for transmission; or on a retained distribution system, inspect every aspect, ground the various units properly and permanently and increase shielding at various locations, in order to reduce as much as possible the environment input of the noise signals.

It has also been found that excess noise in the upstream direction can overload the upstream portion of the bidirectional amplifiers, which can cause oscillation in the bidirectional amplifiers in the trunk and/or the distribution lines. Since the level of noise cannot be predicted because both its timing and amplitude is random, this has posed a major problem.

The present invention is a CATV network which allows for the first time an existing cabling structure to be able to be used in a bidirectional mode, by substantially reducing or eliminating the effect of noise gathering.

In a typical system, the downstream signals are contained within a high frequency band, e.g. typically between 50 mHz and 500 mHz, while the upstream signals are contained within a low frequency band, e.g. between 5 mHz and 30 mHz. In the present invention the downstream directional signals are untouched. The trunk retains its bidirectional amplifiers, that is, amplifying downstream signals in the high band and amplifying upstream signals in the low band.

According to a first embodiment of the present invention, the upstream signals are contained in one or more narrow bands within the low band, preferably centered at two frequencies, e.g. 11 mHz and 26 mHz, with a bandwidth of e.g. 1 mHz. It should be noted however that the present invention is not limited to narrow band or to the use of two upstream signaling frequencies, since one, or more than two frequencies could be used.

Narrowband upstream filters are located in the distribution lines, preferably but not necessarily just next to the points that the distribution lines are connected to the trunk. They may also be connected in the trunk, and the filters may be connected in series within the network. The downstream signals are unaffected.

Preferably the upstream signals are carriers modulated by digital signals, e.g. at a 500 kb/sec rate using minimum shift keying or an equivalent frequency modulation technique.

The result of the above is that all upstream signals outside the narrow bandwidth of the upstream signaling bands are blocked. Thus all noise, which will include the vast majority of the noise, which is outside the narrow signaling band of the narrow bands is blocked. The utilization of the rest of the bandwidth outside the narrow bands for video transmission is thus made possible.

Because the resulting amount of total energy (signal plus noise) within the narrow signaling bands is made low, the likelihood of overloading the upstream amplifiers by noise signals causing oscillation of the downstream amplifiers in the trunk will be very low, by the use of the present invention.

Thus by the use of the present invention the problem of overloading in a bidirectional CATV network is substantially reduced.

According to a second embodiment of the invention, each of the upstream filters of the kind described above contains a gate, which blocks all upstream signals. Thus all noise entirely across the low frequency upstream band will be blocked. Each of the filters contains a circuit for detecting the energy level of upstream signals carried in the narrow frequency band, which is detected at the input to the filter. When the energy exceeds a predetermined threshold, it is assumed that the energy consists of a signal to be transmitted to the head end. Below the threshold the energy is considered to be noise. When the energy level is above the predetermined threshold, the gate opens, allowing signals within the narrow frequency band of the filter to pass to the trunk and thus to the head end.

Thus in accordance with this second embodiment, there is no contribution to the trunk of any noise whatsoever, even in the narrow signaling bands, unless an actual upstream signal is being transmitted. The gate then opens automatically without intervention from the head end, allowing the signal and only the small energy content of noise within the narrow signaling band of the low band to pass through. Since all other filter gates are closed at that time, the noise passed upstream to the head end is reduced substantially even in comparison to the passive filter embodiment. The interval for sensing of energy level and the opening of the gate should be very short, within a 5 microseconds interval or less to permit implementation of a multi-access protocol (the use of the same channel by several subscribers with the head end recognizing and dealing with collisions—see Canadian Patent Application 550,764 filed Nov. 2, 1987 invented by Samir Sammoun) and realize the result of little effect on performance. It should be noted, however, that for optimum noise blocking, this interval should be maximized.

It is important to recognize that in the prior art, distribution switches are polled from the head end in order to determine which subscriber is transmitting, in order to obtain the upstream transmitted data. That is both difficult and is a very slow technique for receiving system signals due to the time required to complete the polling, in contrast to the present invention which does not require polling.

A prototype system built according to the second embodiment was tested on an actual CATV network with about 4,000 subscribers per switched filter and was found to be reliable at least 99% of the time, which is believed to be a substantial advance in the state of the art.

According to a further embodiment passive filters as described with respect to the first embodiment above can be used in the distribution lines, and an active filter containing the gate and energy sensor described with respect to the second embodiment can be used in the upstream direction in the trunk.

In a fourth embodiment, the active filters in the distribution lines can be addressable. The gates in the filters can be purposefully opened or closed by selectively addressing them from the head end. Thus in this embodiment each of the filters should have an unique address. A signal passed from the head end downstream and received by the filter would cause the gate to open or close as desired from the head end. This allows the head end to selectively test individual distribution lines, or perform a remote program source switching operation.

While the upstream signaling bandwidth has been described above as preferably being comprised of two narrowband signaling frequencies within the upstream low frequency band, the upstream signal can instead be comprised of video signals or other program signals. Distribution lines can be split off from the trunk adjacent a single (or multiple) subscriber location, which can connect to a remote studio containing several cameras. Each of the cameras can be connected to a separate distribution line which contains a selectably addressable filter. By enabling the individual filters from the head end, their individual gates can be opened, and individual signals from selectable cameras transmitted to the head end. At the same time noise gathering from other distribution lines is blocked. This type of system is useful for the remote controlling from the head end of remote broadcasts, e.g. the transmission of university courses using several cameras without requiring local switching personnel, the provision of video conferences from various locations, remote control of surveillance cameras, the reception of different types of signals for simultaneous or later transmission to other subscribers, the remote gathering of news, the provision of audio or video forums, etc. Of course the filters in this case should have bandwidth sufficient to accommodate the upstream signal.

All of the above is made feasible using the present invention avoiding the problem of noise gathering.

In accordance with the present invention, an embodiment thereof is a CATV network comprising a bidirectional trunk for connection to a head end and bidirectional distribution lines connected to the trunk to which subscriber drops can be connected, the distribution lines including means such as an amplifier for transmitting upstream signals in at least one narrow frequency band, a bandpass filter connected in the upstream direction in each of the distribution lines having passbands corresponding to the narrow frequency band or bands for blocking upstream noise and signals which may appear on the distribution lines except those contained in the narrow frequency band or bands. Preferably the filters are connected in the distribution lines immediately adjacent their connections to the trunk. However in some cases it may be desirable to connect the filters at the subscriber locations, e.g. within the drops or immediately adjacent the subscriber equipment connection facility.

In accordance with a preferred embodiment, each filter includes a gate for blocking all upstream signals, filter containing a gate being defined herein as an active filter. A circuit is included for detecting the energy level of upstream signals carried in the narrow frequency band or bands on a corresponding distribution line, and opens the gate to allow upstream signals to pass along the corresponding distribution line within the passband in the event the energy level is above a predetermined threshold.

In accordance with a further embodiment a circuit is included in each filter for receiving an address signal passing downstream on the distribution lines, and a circuit is included for opening the gate upon receipt of the addressed signal. Preferably addresses unique to each of the corresponding filters are used.

In accordance with a further embodiment the gate opens to allow video or other wideband signals to pass upstream.

In accordance with another embodiment, the passive (gateless) filters are connected in the distribution lines, but an active (gate included) filter is connected in the trunk between the head end and the location of the closest distribution line connection to the trunk.

Figure 7:
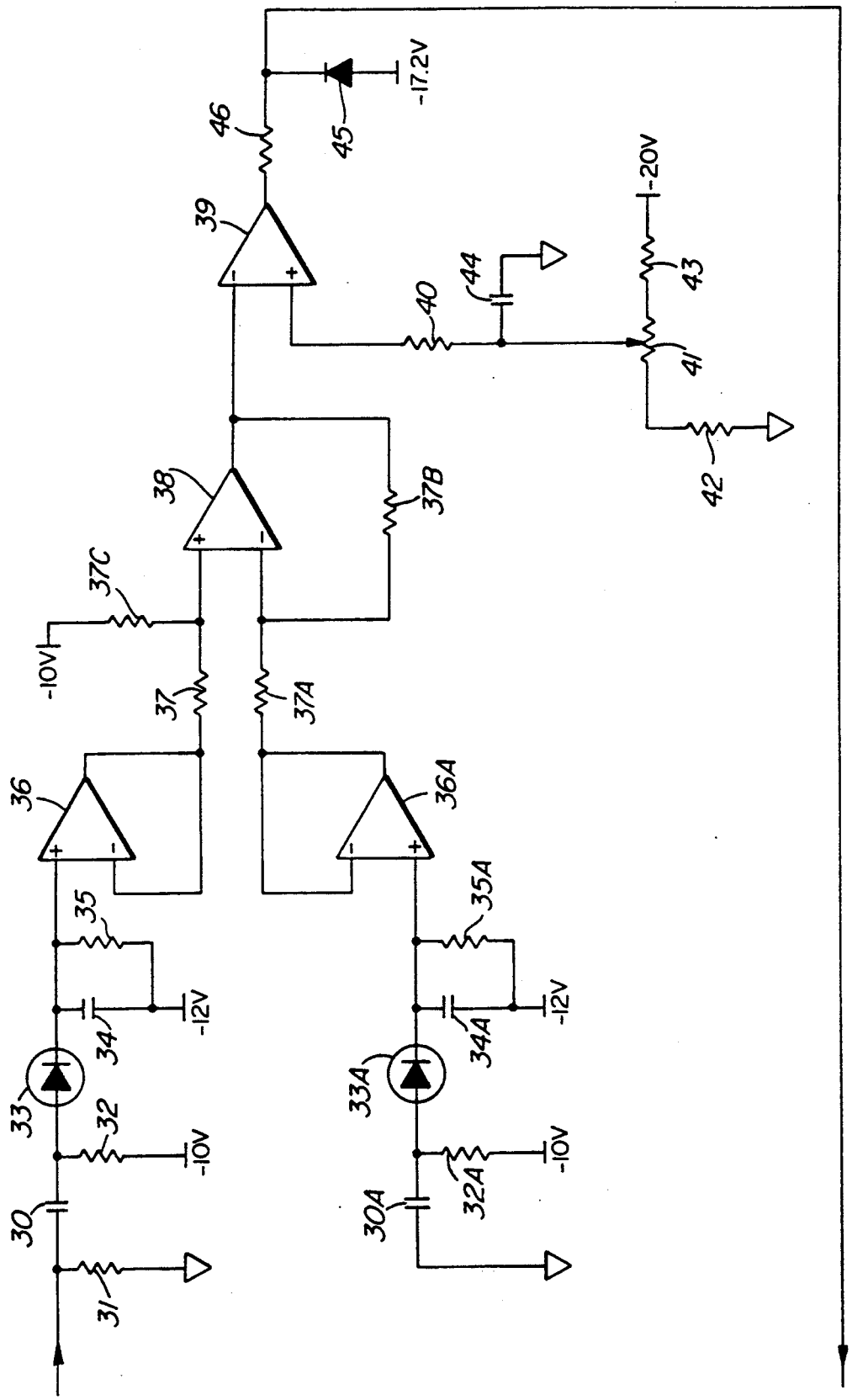
Figure 8:
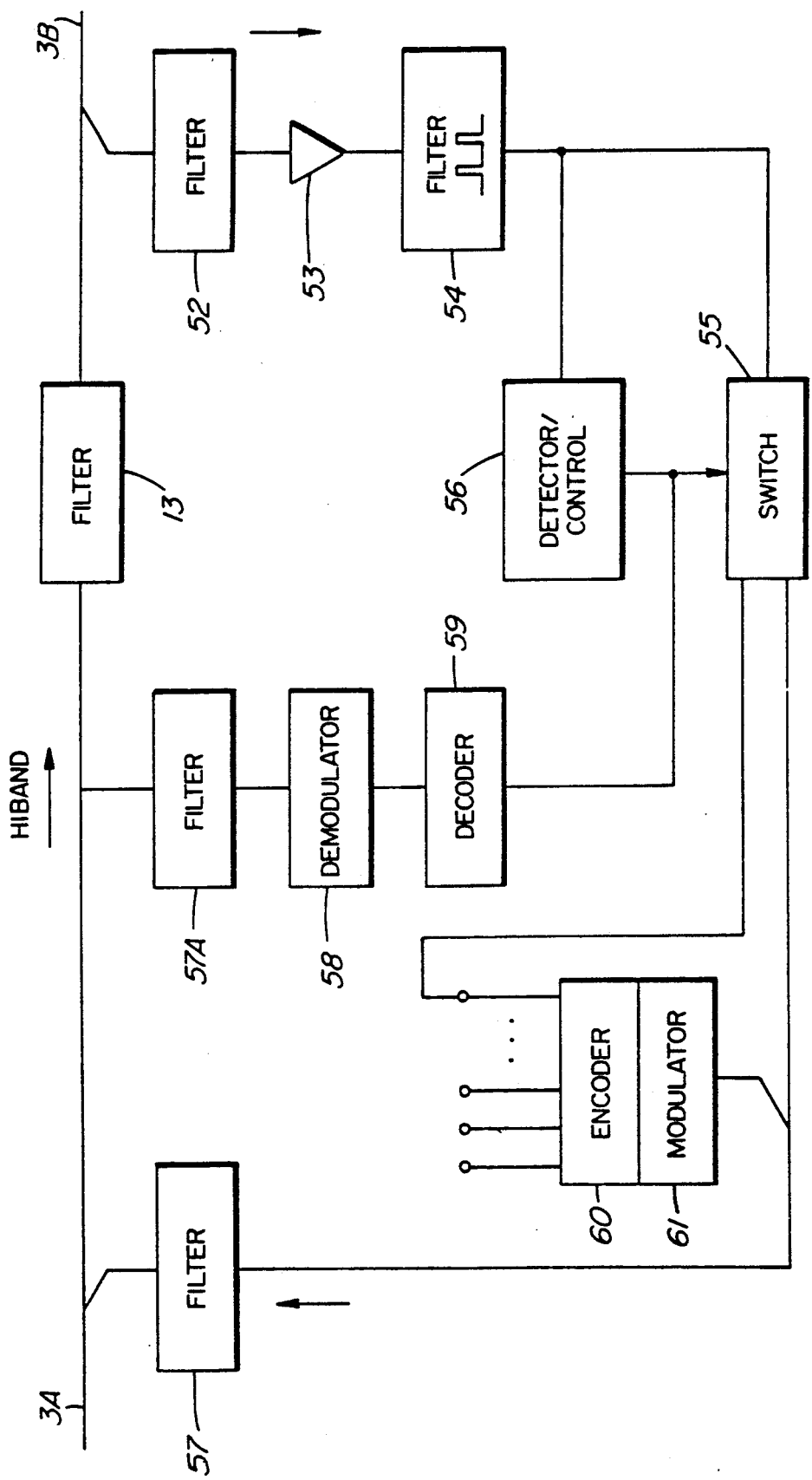
Figure 9A:
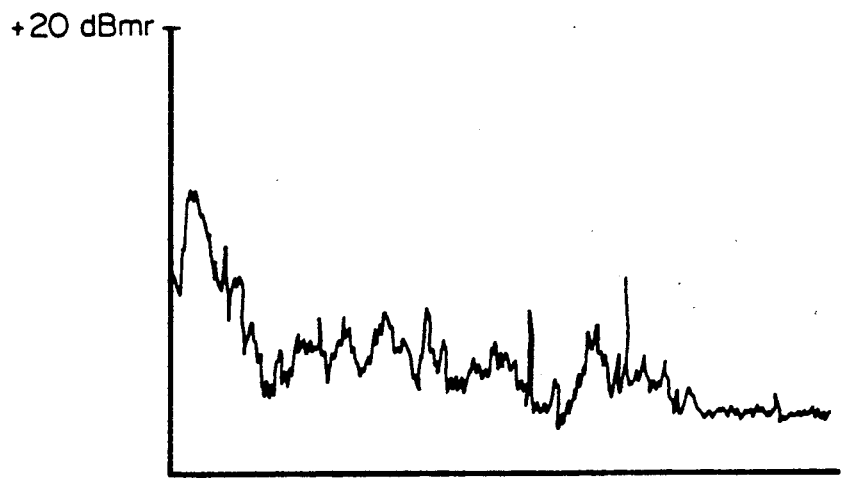
Figure 9B:
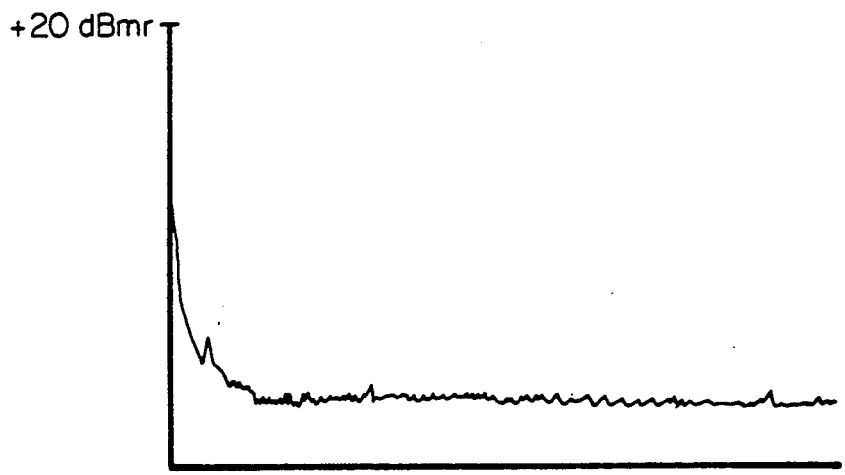
Figure 9C:
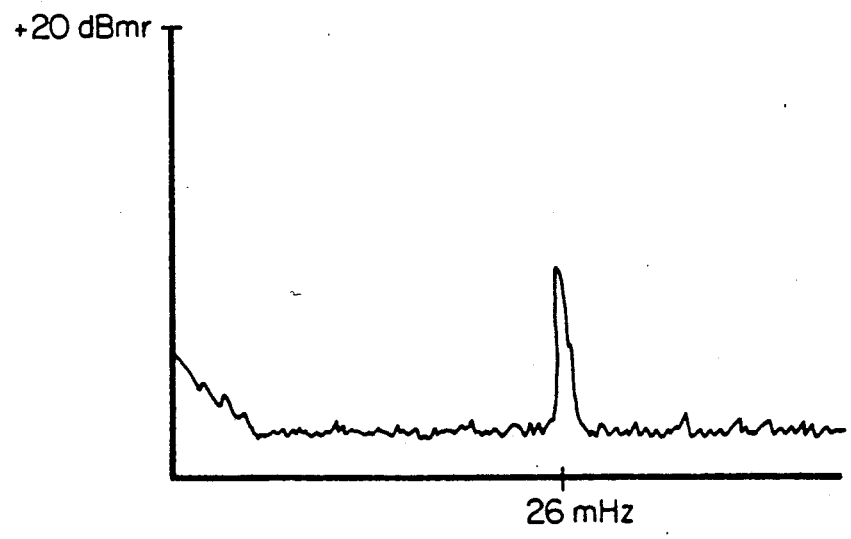

A better understanding of the invention will be obtained by reference to the detailed description below in conjunction with the following drawings, in which:

FIG. 1 is a block schematic of a CATV network according to the prior art,

FIGS. 2A and 2B respectively illustrate the low and high frequency bands, and the preferred signal frequencies of the upstream signals, FIG. 3 is a block schematic illustrating at least one embodiment the present invention, and appears on the same page as FIG. 1, FIG. 4 is a block schematic illustrating the preferred filter structure of the present invention, FIG. 5 illustrates how FIGS. 6 and 7 should be placed together, and appears on the same page as FIG. 7, FIGS. 6 and 7 placed to-ether form a schematic diagram of an active filter according to the preferred embodiment of the present invention, FIG. 8 is a block diagram of an addressable active filter, according to an embodiment of the present invention, and appears on the same page as FIGS. 2A and 2B, FIG. 9A is an example of a spectrum diagram of the upstream signal received at the head end as in a prior art network, FIG. 9B is a spectrum diagram of the upstream signal received at the head end using the preferred embodiment of the present invention, in the absence of an upstream signaling signal, and FIG. 9C is a spectrum diagram of the upstream signal received at the head end, using the preferred embodiment of the present invention, in the presence of an upstream signaling signal centered at 26 mHz.

FIG. 1 illustrates a bidirectional CATV system in accordance with the prior art. A head end 1 is connected to a trunk 2, to which distribution lines 3 are connected. Subscriber drops 4 connect to the distribution lines, and subscriber station equipment 5 such as TV sets are connected to the subscriber drops.

The station equipment 5 in the present embodiment includes upstream signal generation means as described in Canadian Patent 1,177,558 issued Nov. 6th, 1984, invented by Michel Dufresne et al. At least one bidirectional amplifier 6 is usually connected in series with the trunk, for amplifying the downstream signals illustrated by arrow 7 and by the upstream signals illustrated by arrows 8.

In the system according to the prior art, in addition to upstream signaling signals, significant noise is passed upstream from the distribution lines 3, drops 4 and station equipment 5. This noise as described earlier in this specification is typically caused by automotive ignitions, ground currents, poor ground connectors, 60 Hz powerline signals which themselves carry additional noise, radio frequency pagers, radio telephones, other radio frequency signals, etc. The distribution lines act as large distributed antennae, all feeding their noise signals into the upstream portion of amplifier 6, where the noise signals are amplified and are fed to the head end 1. Clearly this can overwhelm any legitimate signal generated at the subscriber station equipment to be transmitted to the head end, can overload the trunk and head end amplifiers, and has generally resulted in an unsatisfactory system.

FIG. 2A illustrates a signaling scheme for use on a CATV network. A high frequency band having 1 dB down points between 50 mHz and 400 mHz contains downstream television and/or other signals from the head end through the trunk and distribution lines to the subscriber station receiving equipment. A low frequency band having 1 dB down points between 5 mHz and 30 mHz carries upstream signals between the subscriber station transmitting equipment and the head end via the subscriber drops, distribution lines and trunk.

In the present invention at least one but preferably 2 narrowband upstream signaling frequencies carrying digital signals are used, e.g. in one successful prototype having carrier center frequencies at 11 mHz and 26 mHz, and each being about 1 mHz wide. The positions of these two narrow signaling bands with respect to the low frequency band are shown in FIG. 2B, with reference to FIG. 2A.

Turning now to FIG. 3, a network is shown which is generally similar to that shown in FIG. 1, but has the addition of narrowband upstream filters 9, connected in series with each of the distribution lines 3 adjacent the point at which they are connected to the trunk 2. The upstream filters 9 should be bandpass filters having narrow passbands centered on the upstream signaling carrier frequencies, e.g. in the preferred embodiment at 11 mHz and 26 mHz, and having the bandwidth of the upstream signaling signals, i.e. 1 mHz wide.

In one embodiment the filters 9 are passive, allowing the full high band downstream signal to pass, but only allowing the narrowband upstream signaling signals to pass upstream. Thus nearly all of the upstream noise from each of the distribution lines will be blocked; the only noise which will pass upstream is the relatively small amount of noise energy contained within the narrow passband of the filters. Clearly this substantially reduces the amount of noise gathered and applied to the trunk and head end amplifiers, substantially improving the signal to noise ratio in the trunk outside the narrow band, and substantially reducing the possibility of overloading the trunk bidirectional amplifiers which would reduce the signal to noise ratio within the narrow band(s) at the head end.

In a second embodiment the upstream filters 9 contain active circuits, to be described below, which detect the energy content of the signal within the passbands of the upstream filters. In the case of noise, almost all of the time the energy content of those passbands will be low. However if a signal is being transmitted from the subscriber station equipment, it will be concentrated within the filter passband. The energy level in that case will thus be much higher.

Each of the upstream filters contains a gate which stops all signals from passing upstream into the trunk. Thus the noise passed into the trunk from the distribution lines will be reduced to a negligible value. When the energy which results from the transmission of a signal from the subscriber station equipment, which is concentrated within the passband of the filters, is received, its energy level will be high, and above a predetermined threshold. When this threshold has been exceeded, the gate opens, allowing those signals within the passband of the filter to pass upstream. Since typically only one subscriber will be transmitting at a time (although this is not universally true), only one upstream filter will be open at a time and thus the signal and the very small amount of noise energy within the upstream signaling narrowband will be carried from the single distribution line through trunk 2 to the head end 1. The amount of total noise energy thus received by the head end will be reduced to the portion contributed by that distribution line, and only the noise within the narrow signaling band.

Clearly also any excessive noise in one subnetwork is kept isolated from affecting the other subnetworks by the filters.

In accordance with a third embodiment, the upstream filters 9 are passive, as described with respect to the first embodiment, but active filters 10 and 10A are connected in upstream series with the trunk 2 to isolate and divide the network. Subnetworks are subdivided by series active filters 10A. Active filters 10 and 10A are similar to filter 9 as described with reference to the second embodiment, that is, each contains a gate which stops the transmission of all upstream signals in the associated subnetwork until an upstream signal exceeding a predetermined threshold within the narrowband upstream signaling bands is received, then it will open, allowing the signaling signals to pass upstream.

It should be noted that active filters 9 and 10 and 10A in whatever form are used, are transparent in the downstream direction allowing the high frequency band signals to pass downstream, unimpeded.

If filters 10 and 10A are present, they are active, and filters 9 may be active or passive (as described above). If filters 10 and 10A are not present, filters 9 can be either active (as in the second embodiment) or passive (as in the first embodiment).

In accordance with a fourth embodiment, active filters 10 and 10A may or may not be present, but at least upstream filters 9 are individually addressable from head end 1. When addressed to either be purposely opened or closed, they allow the head end to test or control the transmission of signals passing along one or more distribution lines.

In accordance with another embodiment, a separate conditioned line for carrying upstream video is connected to the upstream filter, and the upstream filter bandwidth is wider., sufficient to accommodate a video signal. The filter senses the video signal presence as exceeding a threshold, and opens. While the video camera can be locally or remotely controlled, the filters are controlled by sensing of the video (or indeed any other upstream signal such as a conferencing signal) from the cameras. Indeed the video filter can be in the same narrow band upstream signaling filter described above. This allows subscriber station equipment connected to the trunk through reconditioned or individual drops on the distribution line to generate video signals, which can be switched into the trunk and head and by the automatic sensing of the signal pressure or by the head end addressing the upstream filters 9. It may be desirable in this or in other embodiments to locate the upstream filters adjacent or at one subscriber station equipment or to make the station equipment remotely controlled from the head end.

By arranging several subscriber stations together in one room, with video cameras connected as the subscriber station equipment, and by the use of the upstream filters described above, remote studios can be formed, remotely controlled from the head end 1 by using the upstream filters as remote switchers or by automatic sensing of the video signals, switching remote selectable video signals generated at the subscriber station video equipment into the trunk and into the head end as desired at the dead end. The CATV network is facilitated for this upstream transmission also because of the reduction of noise gathering due to use of the filters in the remaining subnetworks or distribution lines of the system.

FIG. 4 is a block diagram of a preferred form of an active filter for use in the present invention. The lead 3A represents the input of the upstream part of a cable distribution line and the lead 3B represents the input of the downstream part of the cable distribution line. A high band bandpass filter 13, e.g. for passing signals between 50 mHz and 400 mHz is connected in the trunk or distribution line between leads 3A and 3B, to allow high band signals to pass downstream, but to block low band upstream signals. The arrows represent the signal direction.

60 Hz power is typically passed from either direction along the cable to power remote line amplifiers. A 60 Hz low pass filter 14 is connected in parallel with filter 13. This allows 60 Hz power signals to pass around filter 13 along the distribution line or the trunk from lead 3A to lead 3B or vice versa.

Part of the 60 Hz signal s tapped, and is applied to AC/DC converter 15, which generates e.g. 12 volts DC for operation of the active filter to be described below.

Also connected in parallel with filter 13 is an upstream low band bandpass filter 16. This filter is powered from the 12 volts DC generated in converter 15. Filter 16 passes the upstream signaling signals from lead 3B to lead 3A along the distribution line. It also blocks all upstream signals outside its pass bands. In the preferred embodiment the filter 16 has one mHz passband centered at 11 mHz and 26 mHz, as shown in FIG. 2B.

With the use of the embodiment of FIG. 4, it may be seen that upstream noise within the low frequency upstream band 5 mHz -30 mHz is blocked from passing upstream through filter 13 because it has a passband only between 50 mHz and 500 mHz. Similarly filter 14, being a 60 Hz filter, will not pass upstream signals between 5 mHz and 30 mHz. The upstream bandpass filter 16 blocks all signals except for those within the upstream signaling bands, which can be one or more narrowbands, but which preferably is at the 11 mHz and 26 mHz center frequencies as described above. Thus virtually all noise is blocked from being passed upstream.

The downstream high band filter is a conventional LC filter and need described in detail as it is known to those persons skilled in the art.

Also in the preferred embodiment, upstream bandpass filter 16 contains a gate which blocks noise even within the upstream signaling bands, unless the energy level is above a predetermined threshold. A detailed description of this active filter will be given below.

Referring to FIGS. 6 and 7 placed together as shown in FIG. 5, the upstream signal is received on lead 3B and is amplitude limited by inversely poled parallel connected diodes 20A and 20B connected between lead 3B and ground. The signal is then passed into a preamplifier 21, where it is amplified, through a multiple segment L-C filter 22, having a 26 mHz or 11 mHz center frequency and 1 mHz passband, and passes through an output amplifier 23 from which it is capacitively coupled by capacitor 24 to a signal splitter 25. The circuit so far described provides an output signal at 11 mHz or 26 mHz, one mHz broad.

The output signal is amplified further in amplifier 26, from which it is applied to the input of an electronic switch 27. The electronic switch 27 must switch very quickly, e.g. within a microsecond. A switch which has been found very satisfactory for this is type 4053B.

The output of electronic switch 27 is capacitively coupled by capacitor 28 to a 75 ohm pad 29 to the distribution line 3A, which typically will be operating at an impedance of 75 ohms.

Thus, when electronic switch 27 is enabled, the input signal from lead 3B, restricted to the passband of the filter e.g. at 11 mHz or 26 mHz center frequency and 1 mHz wide, will be switched with great speed to distribution line lead 3A, from which it passes upstream to the trunk.

In order to control the operation of the electronic switch 27, the signal from splitter 25 is applied via capacitor 30 bypassed by resistors 31 and 32 at both ends thereof, to a half wave rectifier diode 23, the output signal of which is integrated by capacitor 34 bypassed by discharge resistor 35. This accumulates the energy in the input signal and provides a variable DC output voltage which is proportional thereto. The resulting variable DC output voltage is amplified in operational amplifier 36, the output signal of which is applied to the noninverting input of operational amplifier 38.

A circuit identical to that described above connected between elements 30 and 36 is connected to the inverting input of operational amplifier 38, the elements of which having been similarly labelled followed by the designation A, that is, elements 30A-36A. The purpose of elements 30A-36A is to provide reference level compensation for the rectifying circuit in the previously described branch connected to the noninverting input of operational amplifier 38. This provides both temperature compensation and level compensation for the diode threshold and for the element variances caused by temperature variation. Resistors 37 and 37A respectively connect the outputs of amplifiers 36 and 36A to the noninverting and inverting inputs of amplifier 38. Resistor 37C connects the noninverting input to −10V and resistor 37B connects the inverting input of amplifier 38 to its output.

The integrating circuit described above determines the speed of detection and should have a time constant of 5 microseconds or less. It should be short enough to open, so as not to cut off a signal but long enough to avoid triggering by noise. In case the input signal is video (requiring the filter comprised of elements 21, 22 and 23 to be substantially broader in bandwidth than described earlier to accommodate the video), the switching speed of the integrator can be substantially relaxed. It should be noted that the longer the time constant, the greater the reliability will be.

The output signal of amplifier 38 is connected to a level detector. This s preferably comprised of an operational amplifier 39, to the inverting input of which the output signal of amplifier 38 is applied. The detection threshold is set by the noninverting input to amplifier 39 being connected through resistor 40 to the gap terminal of a potentiometer 41, which itself is connected in series with resistors 42 and 43 at its opposite terminals respectively between a source of −20 V and ground. The tap terminal of potentiometer 41 is by-passed to ground by capacitor 44.

The threshold setting circuit will cause amplifier 39 to output either 0 volts or −20 volts when the rectified and integrated input signal from splitter 25 is above or below the level set on potentiometer 41 between −20 V and ground (0 V). This output signal is applied to the cathode of diode 45 through resistor 46. The anode is connected to −17.2 V. Thus when the output of amplifier 39 is 0 V diode 45 will be reverse biased (off), and when the output of amplifier 39 is −20 V, diode 45 will be biased into its conducting state and the voltage on its cathode will be approximately −17 V. With the cathode of diode 45 connected to the control input 48 of electronic switch 27 the electronic switch will be turned on when diode 45 is conducting, i.e. when the output of amplifier 39 is −20 V, and off when diode 45 is reverse biased.

With the time constant of the integrator less then 5 microseconds, and the switching time of electronic switch 27 less than 1 microsecond, clearly when the input signal results in the threshold set by potentiometer 41 is exceeded, electronic switch 27 will cause the input signal passing through the filter and appearing at splitter 25 to be switched very rapidly to the upstream distribution line lead 3A.

The switch state monitor lead could also be connected to a control input of filter 22 (if it were made on active filter), to control and thereby open or close its bandwidth.

The above-described circuit should be duplicated for each of the narrowband signaling signal frequencies appearing on the same distribution line or trunk. In the case of two signals transmitted at different sequential times at the 11 mHz and 26 mHz signaling bands e.g. using MSK, only one or the other of the filters will be transmitting at a time. This can further reduce the amount of noise carried upstream of the filter into the trunk over the case in which both signals are transmitted simultaneously (mf).

Additional enhancements may be made to the above-described circuit. For example the control input to electronic switch 27 can also be connected to the output of an addressable receiver-controller 47, which responds to an unique code received in the downstream direction from the head end in the high frequency band. This will be described in more detail with respect to FIG. 8. However with respect to the present figure, controller 47 receives a signal, demodulates it, decodes it and applies a constant open or constant close level enable signal (0 or −17 V) to the control input of electronic switch 27. This can forcibly control the transmission of signals upstream through electronic switch 27 for testing or for signaling source control purposes, as described earlier.

A second contact 27A in electronic switch 27 can be connected through capacitor 48A to a switch state monitor lead. This switch state monitor lead can provide signals input to it e.g. to the upstream lead 3A, or to another switch to provide acknowledgement of the receipt of the remotely controlled electronic switch control command which is received by controller 47, or to provide a second switch state indicative to the head end and or to local control equipment.

The switch state monitor lead can be connected to the input of an encoder 49, the output of which is connected to a modulator 50, which has its output connected through a 75 ohm line matching pad 29A, to upstream lead 3A. In this case the receipt of an addressable command causes switch 27 to operate. As a result a pulse appears at the input of encoder 49, which generates a code, modulated n modulator 50, which is applied through output pad 29A to the upstream lead 3A. This can be used to provide acknowledgement of the receipt of a command to close switch 27, since in the case of testing of switch 27, there may otherwise not be any input signal passing therethrough to be received and noted by the head end.

Alternatively the output of modulator 50 can be connected into the input of switch 27 for transmission of an acknowledgement code generated by encoder 49 through switch 27 as if it were a signal received through the filter comprised of elements 21, 22 and 23.

A block diagram illustrating a variation of the above is shown in FIG. 8. In this figure high pass filter 13 is connected between leads 3A and 3B as described with reference to FIG. 4. The upstream signal is passed through a low band bandpass filter 52 which passes signals between e.g. 5 mHz -30 mHz. The upstream signal then passes through an amplifier 53 and a narrowband upstream signal filter 54 such as that described with respect to elements 21, 22 and 23. The output of filter 54 is connected to the input of electronic switch 55, which is controlled by a threshold detector/control circuit 56 such as that described earlier with respect to elements 30-45 in FIGS. 5, 6 and 7. The output of switch 55 is connected to the input of another filter 57 which is similar to filter 54. The output of filter 57 is connected to the upstream lead 3A, which is the distribution line connected to the trunk.

A downstream control signal within the high band is received on lead 3A, passes through control signal frequency filter 57A and is received in demodulator 58. The demodulated signal is decoded in decoder 59, and the decoded control signal is applied to the control input of switch 55, in a manner similar to that described with reference to controller 47 controlling switch 27.

The switch state monitor output of switch 55 similar to that described with respect to switch 27 is connected to one of several input terminals of an encoder 60 which has its output connected to modulator 61, which has its output, in the low frequency band, connected to the input of filter 57, from where the output signal of modulator 61 is applied to upstream 3A for application to the trunk and to the head end.

It should be noted that several decoders similar to decoder 59 can be connected to the output of demodulator 58, each one of which dan be connected to a separate input of encoder 60 through controlling of another switch similar to switch 55. This can clearly be used to apply various input signals to the upstream distribution line and trunk. For example, such signals can be from power meters, video signals acknowledgement of appliance turn on at subscriber locations, etc. Further, decoded signals from the head end can be used to switch appliances on and off, activate power circuits, etc. at the subscriber location. Indeed, control signals from subscriber stations can be sent upstream to the head end to command certain functions, such as the transmission of control signals to control or monitor units at the same or different subscriber stations.

The above description of embodiments of the invention have clearly shown that the present invention can be used for a variety of various functions, but at its heart provides means for providing signals to a head end with reliability and substantially reduced of noise. FIG. 9A illustrates the spectrum of the signal received at a head end with a prior art network and is comprised virtually entirely of noise; FIG. 9B illustrates the spectrum of the signal received at the head end utilizing the present filters and is clearly almost clear of significant noise; and FIG. 9C illustrates the spectrum of signal received at the head end with a 26 mHz upstream signaling signal used in accordance with the present invention, and clearly illustrates a very high signal to noise ratio. The improvement over the prior art is seen to be substantial.

A person understanding this invention may now conceive of other alternatives or embodiments using the principles described herein. All are considered to be within the sphere and scope of the invention as defined in the claims appended hereto.

We claim:

1. For use in a CATV network, an upstream filter circuit comprising at least one bandpass filter for receiving an upstream signal, an electronic switch connected to the output of said at least one bandpass filter for applying a filtered upstream signal from said at least one bandpass filter to an upstream line, means for detecting the energy level of said filtered upstream signal at a point between said at least one bandpass filter and said electronic switch, and means for enabling the electronic switch to close in the event said energy level is above a predetermined threshold.

2. A filter circuit as defined in claim 1, in which the detecting means is comprised of a first rectifier for receiving and rectifying the filtered upstream signal, a first integrator for receiving and integrating the rectified signal from the rectifier to accumulate its energy, and a level detector for receiving the integrated signal, comparing it with a controllable reference level, and for outputting a bilevel signal having its level dependent on whether or not the reference level is exceeded by the integrated signal, and further including means for applying the bilevel signal to the electronic switch to enable or inhibit its operation.

3. A filter circuit as defined in claim 2, wherein said detecting means further includes an operational amplifier interposed between the integrator and level detector, the integrated signal being applied to its noninverting input, and a second rectifier having its output connected to a second integrator and its input connected through a low value resistor to ground, the output of the second integrator being connected to the inverting input of the operational amplifier, the first and second rectifiers and the first and second integrators being formed of similar components.

4. A filter circuit as defined in claim 1 in which said at least one bandpass filter is narrowband.

5. A filter circuit as defined in claim 1 in which said at least one bandpass filter is sufficiently broadband so as to accommodate the passage of at least one video signal.

6. A filter circuit as defined in claim 1, further including means for receiving a control signal from upstream of said at least one bandpass filter, means for demodulating and decoding the control signal, and means for enabling or inhibiting the electronic switch by applying the decoded control signal thereto.

7. A filter circuit as defined in claim 1, further including means for receiving a control signal from upstream of said at least one bandpass filter, means for demodulating and decoding the control signal, and means for operating the electronic switch by applying the decoded control signal thereto, the electronic switch including a first contact coupled to said upstream line and a second contact, an encoder containing at least one input connected to the second contact of said electronic switch, the output of the encoder being connected to a modulator for modulating a state signal received from the encoder under control of the control signal onto a carrier signal, the output of the modulator being connected to said upstream line.

8. A filter circuit as defined in claim 1 further comprising a high frequency band bandpass filter having a passband above the frequency range of said at least one bandpass filter, connected in parallel with said at least one bandpass filter, for passing downstream signals therearound.

9. A filter circuit as defined in claim 2 in which said at least one bandpass filter is narrowband.

10. A filter circuit as defined in claim 2 in which said at least one bandpass filter is sufficiently broadband so as to accommodate the passage of at least one video signal.

11. A filter circuit as defined in claim 3 in which said at least one bandpass filter is narrowband.

12. A filter circuit as defined in claim 3 in which said at least one bandpass filter is sufficiently broadband so as to accommodate the passage of at least one video signal.

13. A filter circuit as defined in claim 2, further including means for receiving a control signal from upstream of said at least one bandpass filter, means for demodulating and decoding the control signal, and means for enabling or inhibiting the electronic switch by applying the decoded control signal thereto.

14. A filter circuit as defined in claim 2, further including means for receiving a control signal from upstream of said at least one bandpass filter, means for demodulating and decoding the control signal, and means for operating the electronic switch by applying the decoded control signal thereto, the electronic switch including a first contact coupled to said upstream line and a second contact, an encoder containing at least one input connected to the second contact of said electronic switch, the output of the encoder being connected to a modulator for modulating a state signal received from the encoder onto a carrier signal, the output of the modulator being connected to said upstream line.

15. A filter circuit as defined in claim 3, further including means for receiving a control signal from upstream of said at least one bandpass filter, means for demodulating and decoding the control signal, and means for enabling or inhibiting the electronic switch by applying the decoded control signal thereto.

16. A filter circuit as defined in claim 3, further including means for receiving a control signal from upstream of said at least one bandpass filter, means for demodulating and decoding the control signal, and means for operating the electronic switch by applying the decoded control signal thereto, the electronic switch including a first contact coupled to said upstream line and a second contact, an encoder containing at least one input connected to the second contact of said electronic switch, the output of the encoder being connected to a modulator for modulating a state signal received from the encoder onto a carrier signal, the output of the modulator being connected to said upstream line.

17. A filter circuit as defined in claim 2 further comprising a high frequency band bandpass filter having a passband above the frequency range of said at least one bandpass filter, connected in parallel with said at least one bandpass filter, for passing downstream signals therearound.

18. A filter circuit as defined in claim 3 further comprising a high frequency band bandpass filter having a passband above the frequency range of said at least one bandpass filter, connected in parallel with said at least one bandpass filter, for passing downstream signals therearound.

* * * * *